Dec. 18, 1928.
L. A. FRAYER
1,695,955
METHOD OF BLANKING METALLIC ARTICLES
Filed June 11, 1925   2 Sheets-Sheet 1
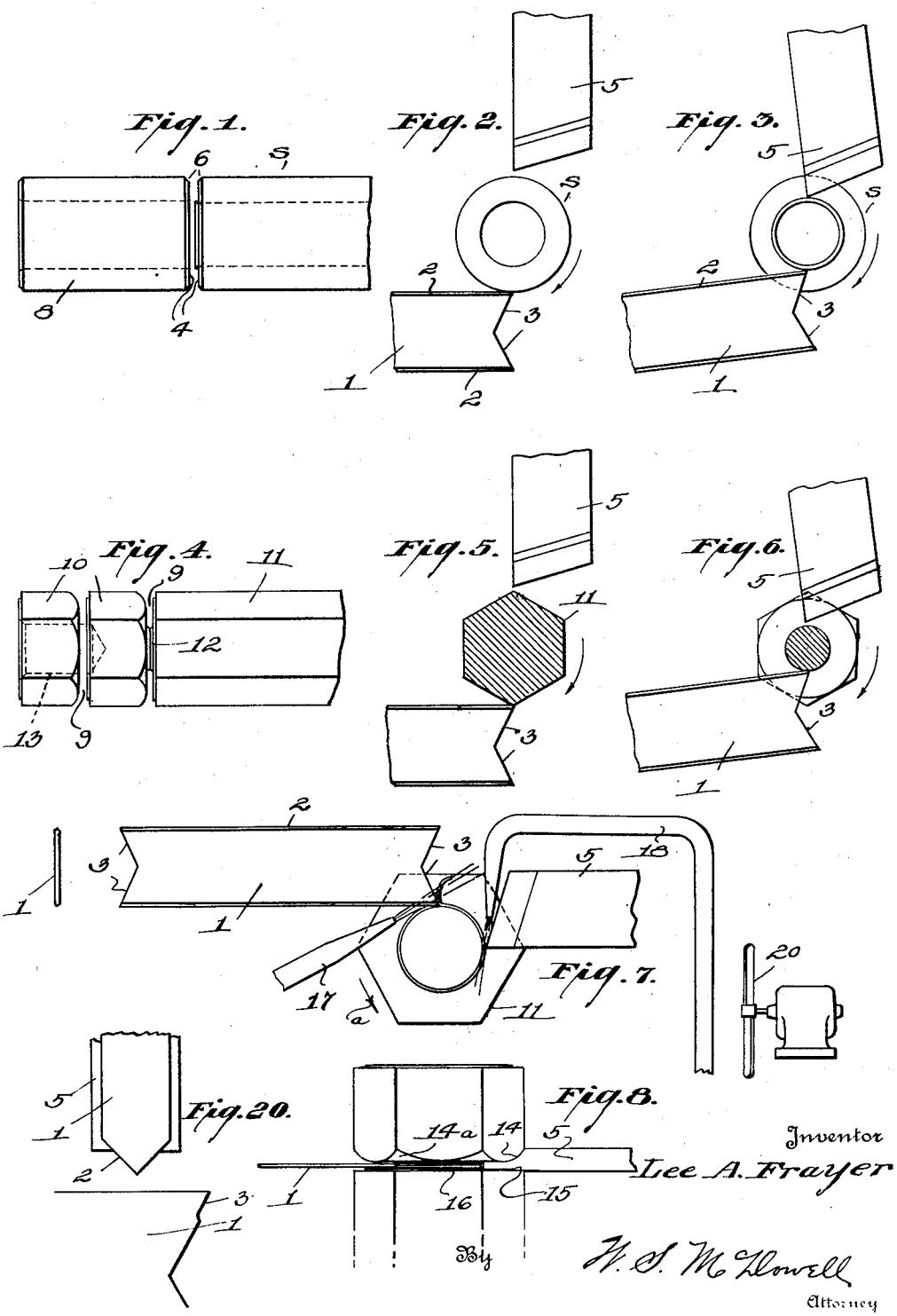
Inventor
Lee A. Frayer
By W. S. McDowell
Attorney Dec. 18, 1928.  1,695,955
L. A. FRAYER
METHOD OF BLANKING METALLIC ARTICLES
Filed June 11, 1925   2 Sheets-Sheet 2
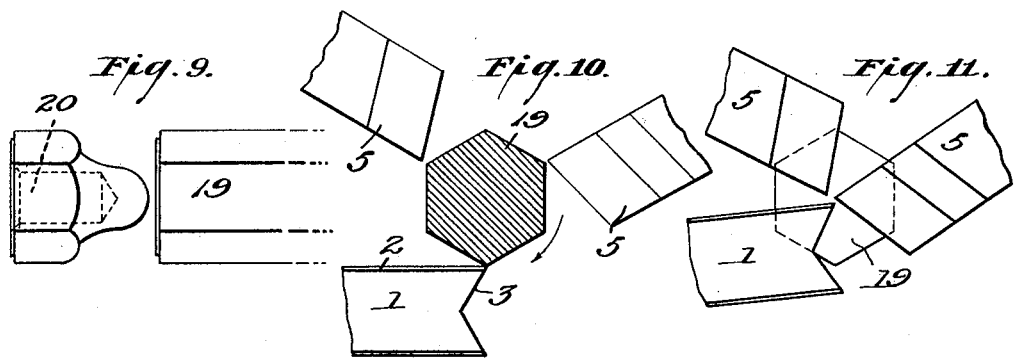
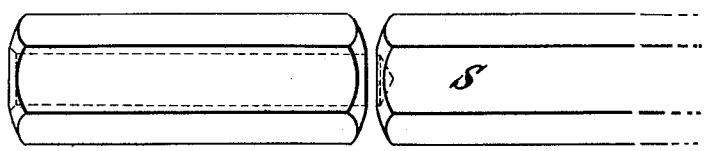
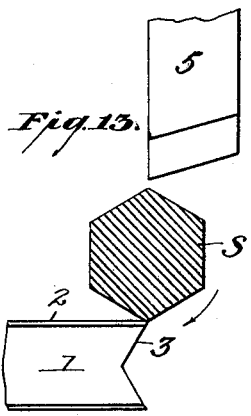
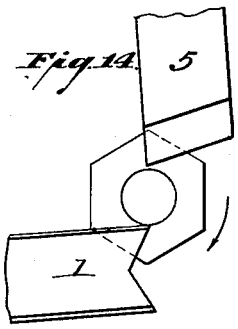
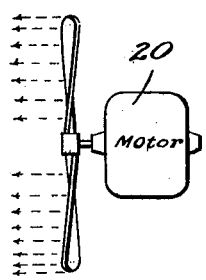
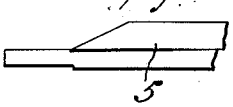
Inventor
Lee A. Frayer Patented Dec. 18, 1928.

1,695,955

UNITED STATES PATENT OFFICE.

LEE A. FRAYER, OF COLUMBUS, OHIO.

METHOD OF BLANKING METALLIC ARTICLES.

Application filed June 11, 1925. Serial No. 36,529.

This invention relates to metal working and is especially directed to a new and improved method for removing metal in the art of fabrication, the invention being particularly applicable to the manufacture of nut blanks and other similar articles.

Among the several objects of the invention are:

A new method of grouping and applying severing tools to bar stock so as to quickly and efficiently effect the severing operation, and accomplish this in such a manner as to reduce the waste of the stock, produced by the severing operation, to a minimum; in removing the stock by means of a plurality of peculiarly constructed and arranged cutting tools, one of the cutting tools serving as a primary gouging or roughing tool and formed to produce a thin, narrow cut in the stock and in associating with this primary tool a secondary cutting tool which follows in the cut produced by the first named tool and serves to widen the cut so as to provide side clearance for the primary tool, to afford room for chip relief and discharge and to permit of the passage of the coolant around the cutting edges of the tools to permit of continued and expeditious operation; in the provision of a method for cutting articles from bar stock which consists in producing a longitudinally extending axial bore in a length of the stock, and in cutting the bar transversely to an extent necessary to produce a connecting web between the blank and the body of the stock which is severed by the advance of the axial bore through the article, and various other features and steps hereinafter described and claimed.

In the accompanying drawings, forming a part of this specification and in which the various steps involved in my improved method have been depicted:

Figure 1 is an elevation of a section of tubular stock severed in accordance with features of the invention, Figure 2 is a diagrammatic view showing the initial position of the severing tools or cutters and the relative positions thereof immediately prior to the cutting or severing of the stock shown in Figure 1, Figure 3 is a similar view showing the cutting or severing tools in their relative positions after the severing cut has been substantially completed, Figure 4 is a side elevation of hexagonal bar stock showing the latter cut to form nut blanks, Figure 5 is a diagrammatic view illustrating the severing cutters in their primary positions immediately prior to severing the stock disclosed in Figure 4, Figure 6 is a similar view illustrating the severing cutters in their final relative positions producing the completed transverse cut in the stock, Figure 7 is a slightly enlarged view showing more particularly the relative positions of the transverse cutters, Figure 8 is a plan view thereof, Figure 9 is a side view of blank stock, illustrating the blank produced by the cutting operation wherein the chamfer is of elongated unusual form, Figure 10 is a diagrammatic view showing the grouping of the transverse cutting tools in producing the blank disclosed in Figure 9, Figure 11 is a similar view showing the final positions of the transverse cutters upon the completion of the cut, Figure 12 is a side elevation illustrating bar stock and a blank produced therefrom in accordance with the cutting arrangement comprising the present invention, wherein the amount of drilling or boring exceeds the cutting or severing operation, Figure 13 is a view showing the position of the severing cutters at the beginning of the severing of the stock shown in Figure 12, Figure 14 is a view showing the final positions of the cutters, Figure 15 is a plan view showing one of the secondary cutters when the latter consists of a plurality of parts, Figure 16 is a horizontal sectional view therethrough, Figures 17, 18 and 19 are detail views showing various forms of cutting edges which may be employed on the primary cutting tools, and Figure 20 is a detail edge view showing the relation between the cutting edges of the primary and secondary tools.

My invention may be usefully employed in the manufacture of nut blanks from bar stock and may be embodied in bar machines employed for this purpose. Specifically the invention is directed to a novel arrangement of cutters and the method of using the same in cutting the stock. Therefore, it has not been deemed necessary herein to illustrate a specific machine in which the cutters and method of operation may be employed, since the invention in its broader aspect may be embodied in metal working machines employed for accomplishing many different functions.

In the art of cutting metal it has been customary and has been considered necessary to form a cutting tool in such a shape and manner as to provide its own clearance, so that the tool can operate in producing a cut without side friction and to permit of the release of the chips produced thereby. Tools so cleared generally either change size or shape or both upon sharpening and therefore have but limited use when precise operations are required. Various forms of tools have been designed to overcome this condition, and in the present invention there is provided especially a new tooling arrangement for meeting this condition consisting of a primary tool, which removes practically all of the metal, and a secondary tool which furnishes clearance for the primary tool. The primary tool consists of a thin straight sided cutting member whereas the secondary tool is of relatively wider form and follows in the cut produced by the primary tool, so as to widen the cut to procure side clearance for the primary tool and to allow the latter to perform the sole function of cutting the metal. By this arrangement of tools I am enabled to secure a materially greater work output than by the use of ordinary cutting methods wherein the cutting tool is formed to provide its own clearance.

In order to develop more fully these advantages, and others, there is shown in Figures 1 to 3 a tubular length of stock, designated generally by the letter S. To sever this stock transversely into desired lengths in an expeditious waste reducing manner, I employ for the severing operation one or more primary roughing or cutting tools 1. This tool consists of an exceptionally thin straight sided metallic bar, which may be suitably supported by any holding means (not shown) and wherein the cutting bar is provided with longitudinally extending substantially V-shaped cutting edges 2 as shown more particularly in Figure 17. It is of course not necessary in a strict sense that the edges should be of the V-shaped configuration, since as shown in Figure 18 the same may be of U form, and in Figure 19 of tri-sided formation. However, for best results the tool should be of the forms shown in Figures 17 to 19 or some modification thereof. The ends of the tool 1 terminate in receding chip breaking edges 3, by means of which the chips produced in the cutting operation are turned away from the edge of the tool. As shown in Figure 7, each of the primary tools is provided with four cutting extremities or edges, so that by reversing the positions of the tool in its holder, four fresh cutting edges may be presented to the work with each grinding or sharpening operation of the tool. It will be observed, in addition, that due to the straight sided construction of the tool, the metal removed in the sharpening or grinding operation has no effect whatever upon the shape and size of the tool, and it is in this respect particularly that the primary cutting tool differs from the usual type of cutter which embodies its own clearance. Hereinafter the primary cutting tool will be referred to as being constructed without clearance and by this I refer to the straight parallel sides. In a strict sense the V-shaped cutting edges provide inherent clearance, but would not provide clearance for the tool when the latter enters a cut or groove in metal, such for example as shown in Figures 7 and 8.

The primary tool is the first to engage the work or stock S when the severing operation is initiated. This tool is fed into the stock at appropriate rates of speed, and in this instance as the stock revolves there is produced therein a thin annular kerf of but minimum width. This also is in contrast with previous methods wherein ordinary tool formation has resulted in the production of materially wider transverse slots or kerfs and with a relatively corresponding waste of material. I am enabled to use the extremely thin type of primary cutter described by confining its operation to the sole function of producing a severing cut, and in finishing the cut by the employment of an additional secondary tool or tools which operate in the cut produced by the primary tool and serve to provide clearance for the latter and to finish the walls of the cut in any desired manner. By reason of its thin cross-sectional formation, the tool 1 can be fed rapidly into the stock so that the severing operation may be performed at a very high rate of speed.

In combination with the primary tool or tools I employ one or more finishing or secondary tools 5. Each of these latter tools produces a cut of slightly greater width in the stock than the cut produced by the primary tool, in order that the walls of the cut, designated at 4, will be spaced sufficiently to provide clearance for the side walls of the primary tool, to relieve chip formation and congestion in the cut, to afford space permitting of the circulation of a cooling fluid around the tools, and, also, if desired, to produce a finished or formed surface, designated at 6 around the perimeter of the stock and the cut 4.

As shown in Figures 1 to 3 the tools may be so mounted that when fed into the stock their travel will be such that the same will reach a final severing position substantially simultaneously. This is accomplished by imparting continuous travel to both tools at variable rates. Since the stock S in this instance is of tubular form, it follows that by this particular order of operating the tools, a blank 8 will have been removed from the stock shortly after the tools reach the positions indicated in Figure 3.

In Figures 4 to 8 a method of operating the tools is set forth which is very effective and economical in the production of nut blanks especially. The bar stock is of hexagonal external configuration and in the blanking operation the severing tools operate to produce the transverse cut 9 in a plane in advance of the axial boring or drilling operation. The transverse severing tools are of the same construction and operate in substantially the same manner as that previously described, except that in producing the transverse cut the relative positions of the severing tools remain constant throughout the cycle, continuous travel at a constant uniform rate of speed being imparted thereto, the primary tool operating in advance of the secondary tool, as above related. After the cut 9 is formed in the stock to an appropriate depth, a blank 10 is connected with the body 11 of the stock by means of a connecting web 12, which is of substantially less diameter than the axial bore 13, so that as the drilling or boring operation advances, the web 12 will be removed by the drill to effect the final severing of the blank 10 from the body 11.

In this particular operation the conditions are such that the blanks or articles are comparatively short, and both the drilling and severing tools can function simultaneously, the drilling tool being operated to finally sever the nut blank from the body of the stock. This is in contrast with the preceding operation, as set forth in Figures 1 to 3, wherein the transversely operating tools are called upon to effect the final severing. In the operation shown in Figures 4 to 8, the tooling arrangement is such as to make it possible for both boring and severing tools to work a maximum percent of a machine cycle, and accordingly gives the highest production. This is made possible by reason of the fact that the transverse severing tools work on the stock in a plane disposed in advance of the drilling or boring tool. Therefore, since there is no necessity for stopping the operation of one set of tools to allow the other to proceed, both boring and cutting takes place simultaneously and a rapid output is obtained.

As shown in Figures 5 and 6, the transverse cutting tools are so arranged that the primary tool 1, as usual, engages the stock first and produces a thin narrow cut, after which follows a wider finishing or forming tool 5. A plan view of this tool is disclosed in Figure 8, wherein it will be observed that one edge or surface of the tool is round as at 14 to produce a formed surface $14^a$ on the nut blank, while the other side of the tool is shouldered as at 15, to provide a washer pad 16 on the side of a nut blank opposed to the surface $14^a$. While the tool 5 has been shown in Figure 8 as being of integral, one piece construction, it is obvious and within the scope of the invention, to form this tool by the association of two or more component parts as indicated in Figure 15. In transverse cross-section the body of the tool 5 is of greater thickness than the primary cutting tool so as to finish the walls of the cut, provide tool clearance, and to impart to said walls the desired configuration with but a minimum of waste in the material cut. Since the primary cutting tool has already produced a thin cut it is a simple and easy matter for the secondary finishing tool to readily follow in the groove produced by the cut of the primary tool and to operate at a rapid rate of speed.

As shown in Figure 7 a coolant, such as water or a cutting compound, is forced from a rearwardly directed angle into engagement with the cutting points of the tool so as to remove most effectively heat from the cutting edges of the tools and preserve thereby their full cutting efficiency. By applying the coolant to the tool points by way of the rearwardly directed angle a very effective arrangement is provided for distributing the cooling fluid over the tool points so as to secure the maximum benefit from the liquid applied, and in addition the coolant is caused to serve as a means for effecting the positive removal of the metal chips or shavings from the cut in the stock produced by the tools. As shown in Figure 7, with the work revolving in the direction of the arrow $a$, the primary tool serves to produce the V-shaped cut described. By placing the outlet of a coolant conveying conduit 17 in substantially the position indicated, the cooling liquid will flow around the sides of the cutting edge of the primary tool, since the cut has been widened by the operation of the secondary tool. This enables the coolant to be directly applied to the cutting edge of the primary tool and keeps the latter at all times at a proper and most efficient working temperature. The coolant is preferably applied at such a pressure that its velocity may be used in removing the metal chips from the cut as the latter are formed in the cut ahead of the primary tool, and by removing these fine metallic particles, adjacent the cutting edge of the tool the latter is permitted to operate with maximum effectiveness upon the stock to be cut. Similarly, a secondary tool is provided with a conduit 18, by means of which the coolant is conveyed to the cutting edges of the secondary tool. The coolant is forced by pressure against the cutting edges of the secondary tool, and operates in substantially the manner described in providing for the cooling of the primary tool, to maintain the secondary tool at proper working temperatures and to remove the chips or shavings which it produces. This method of applying a coolant is in contrast with the usual practice of simply flowing the coolant around the work and the tool points.

In Figures 9 to 11 there is present a condition in which the article of blank 19 is not drilled or bored throughout its entire length, and wherein the drilling or boring tools must finish their functions and withdraw in advance of the severing tools, which cut to the center of the stock and completely sever the article. In this arrangement, as shown in Figures 10 and 11, there is employed a plurality of finishing or forming tools 5, set at effective angles and fed into the work in any appropriate manner. It is desirable to use a plurality of forming tools in this operation because of the elongated configuration which is imparted to the finished blank, and to the added work which is thus imposed upon the transversely operating tools. It will be observed that the bore 20 does not extend through the entire length of the blank but terminates just short of its formed end. Due to this it is necessary for the severing tools to cut to the center of the stock as indicated in Figure 11. In severing the blank the primary tool 1 first engages the stock and produces the thin narrow transverse cut. Within this cut there immediately follows the points of the forming tools, which complete the cut and control the shape of the finished blank. In this instance, however, the infeeding movement of the secondary or finishing tools 5 relative to the primary tool 1 is regulated so that one of the forming tools will produce the final cut which severs the blank from the body of the stock, as indicated in Figure 11. To effect this one tool has a constant travel and one or more tools a tarrying travel, the ratio of travel being constant or variable.

In Figures 12 to 14 inclusive there is depicted a condition that arises when the amount of drilling or boring far exceeds that of the severing tools, and in which the final severing may be accomplished by the boring tool, the severing tools having been previously withdrawn. This operation is very similar to that disclosed in Figure 4, except that in this instance the amount of drilling or boring is relatively increased and the severing tools operate in a plane which is intersected by the drilling or boring tools but complete their function in advance of the latter with respect to time in the cycle of operation. However, the conditions are similar in that the severing and drilling tools may work simultaneously, with the severing tools operating on the stock in advance of the drilling tools, and wherein the final removal of the blank from the body of the stock is performed by the drilling or boring tool which removes the web connecting the blank with the body and formed by the operation of the severing tools.

To further facilitate the operation and enable the work to be carried on without overheating I preferably cause a circulation of air around the tools and stock in addition to the application of the cooling liquid thereto. I have found by operation that by employing a motor driven fan, such as is indicated at 20 in Figures 7 and 14 that the tendency of the tools to become overheated during intensive operation is effectively prevented and that the tool edges stand up better under the stresses of actual operation and do not require frequent adjustments or replacements. I consider this circulation of air to be a very important feature in enabling high capacity and continued operation to be attained. The air is forced through the liquid coolant so that by a process of evaporation, the working temperature of the coolant is maintained and overheating prevented. It will be understood that the air circulation may intercept the cycle of coolant flow at any desired position and this may be in a plane removed from the tools.

In view of the foregoing description it will be seen that the present invention provides a method of forming nut blanks or other similar articles from bar stock by means of which waste of the metal is maintained in a minimum and a novel arrangement of cutting tools provided. In this connection it should be observed that loss due to the wasting of metal by the transverse cutting tools constitutes one of the largest losses in nut blank manufacture. Due to the provision of automatic machines, labor costs are but slight compared to the waste represented by unimproved methods of cutting. By the method proposed herein waste of material in the severing operation is reduced to a small percent of that now involved in the use of ordinary methods wherein wide cutting tools are provided having their own clearance. In a sense, the saving of material in the transverse cutting is merely an incident of the invention since the latter accomplishes essentially its major saving in the rapidity with which the blanks can be produced as compared with present ordinary methods. The arrangement of the severing tools, as previously described, enables the work to be carried on at materially accelerated speeds and this is brought about principally by the construction of the transverse cutters, their relative arrangement and positions while in operation and the manner of maintaining the cutting edges at proper working temperatures.

It will be understood that the invention may be embodied in metal working machines for any purpose wherein metal is removed from the stock or body, and while the invention has been described particularly as being applicable to bar machines, such specific use is to be taken merely as descriptive or illustrative of one phase of use of the invention wherein the latter operates to an advantage, but such specific use should not be construed in a limiting sense. Also, it will be understood that the parting tools may rotate relative to the stock, instead of the stock rotating relative to the parting tools, or the stock may be moved longitudinally relative to the boring tools or the boring tools moved longitudinally in relation to the stock, or there may be modifications and combinations of these generally accepted and used movements and relations. Therefore, the invention comprehends all such uses and structural associations that may be said to fall fairly within the scope of the following claims.

What is claimed is:

1. The method of cutting metal, which consists in producing a cut in a metallic body by a primary tool having a V-shaped cutting edge, in finishing the cut by means of a secondary relatively wider cutting tool operating in the cut produced by the primary tool and simultaneously therewith, the primary tool being so arranged with respect to the secondary tool that it can only cut along its V-shaped cutting edges.

2. The method of cutting blanks from bar stock, which consists in the use of a transversely arranged primary cutter having forwardly and inwardly sloping cutting edges to produce a narrow cut in the stock to be severed, in finishing the cut by means of a relatively wider secondary cutter operating in said cut and following the primary cutter, the secondary cutter being so arranged with respect to the primary cutter that the latter can only produce a cut narrower than the width of said tool.

3. The method of cutting articles from bar stock, which consists in cutting the stock transversely by the employment of a relatively thin primary cutting tool having straight parallel sides and a substantially V-shaped cutting edge, and in finishing the cut by the employment of an additional secondary tool operating within the cut produced by the primary cutting tool, said secondary tool serving to provide clearance for the latter, the arrangement between said tools being such that the primary tool is not permitted to form a cut having the width of said primary tool.

4. The method of forming nut blanks which consists in cutting the blanks from bar stock by means of transversely arranged severing tools, including a thin primary cutting tool having straight sides and forwardly and inwardly disposed cutting edges, and in the provision of a secondary relatively wider cutting tool operating in the cut produced by the primary tool and serving to provide clearance for said primary tool, the secondary tool being so arranged with respect to the primary tool that it cuts slightly forward of the parallel sides of said primary tool.

In testimony whereof I affix my signature.

LEE A. FRAYER.